US009646140B2

(12) United States Patent
Horadan (10) Patent No.: US 9,646,140 B2
(45) Date of Patent: May 9, 2017

(54) METHOD AND APPARATUS FOR PROTECTING ONLINE CONTENT BY DETECTING NONCOMPLIANT ACCESS PATTERNS

(75) Inventor: Peter H. Horadan, Redmond, WA (US)

(73) Assignee: ServiceSource, San Francisco, CA (US)

( * ) Notice: Subject to any disclaimer, the term of this patent is extended or adjusted under 35 U.S.C. 154(b) by 1183 days.

(21) Appl. No.: 13/108,935

(22) Filed: May 16, 2011

(65) Prior Publication Data

US 2011/0289116 A1    Nov. 24, 2011

Related U.S. Application Data (60) Provisional application No. 61/345,673, filed on May 18, 2010.

(51) Int. Cl.
G06F 17/30    (2006.01)
G06F 21/10    (2013.01)

(52) U.S. Cl.
CPC .................................. *G06F 21/10* (2013.01)

(58) Field of Classification Search
None
See application file for complete search history.

(56) References Cited

U.S. PATENT DOCUMENTS 5,821,936 A * 10/1998 Shaffer et al. ................ 715/810
6,766,305 B1 * 7/2004 Fucarile et al. ................ 705/51
2003/0163581 A1 * 8/2003 Moran ................. H04L 12/5695
  709/235
2005/0125722 A1 * 6/2005 Mistry ..................... G06F 21/10
  715/251
2005/0177716 A1 * 8/2005 Ginter ................ H04N 21/8358
  713/157
2007/0208952 A1 * 9/2007 Nation ................... G06F 21/645
  713/190
2008/0005082 A1 * 1/2008 Hughes et al. ..................... 707/3
2009/0094254 A1 * 4/2009 Akita ................. H04N 1/00244
2009/0313665 A1 * 12/2009 Rouse .............................. 725/93
2010/0057630 A1 * 3/2010 Dale-Thiebout ... G06Q 30/0601
  705/316
2010/0122120 A1 * 5/2010 Lin ........................ G06F 11/076
  714/47.3
2010/0192201 A1 * 7/2010 Shimoni ................ G06F 21/55
  726/3
2010/0205215 A1 * 8/2010 Cook ................ G06F 17/30887
  707/781
2010/0235909 A1 * 9/2010 Eynon ................... G06F 21/552
  726/22

OTHER PUBLICATIONS

Kirk. New software detects bots scraping Web site data. IDG News, article,[online], [retrieved on Jun. 19, 2012]. Retrieved from the Internet <URL: http://news.idg.no/cw/art.cfm?id=C035ECD2-1A64-67EA-E4ED6F305AF6876A>. Describes at least motivations for many of the improper use detection methods in the present application.*

* cited by examiner

*Primary Examiner* — Tyler Torgrimson
(74) *Attorney, Agent, or Firm* — Mersenne Law

(57) ABSTRACT

Methods to detect and hamper or thwart noncompliant access to online data examine access patterns, history and statistical records, and which may send no, incorrect or nonsense data if data harvesting is detected.

19 Claims, 9 Drawing Sheets

METHOD AND APPARATUS FOR PROTECTING ONLINE CONTENT BY DETECTING NONCOMPLIANT ACCESS PATTERNS

CLAIM OF PRIORITY

This application claims the benefit of U.S. provisional patent application No. 61/345,673, filed 18 May 2010.

FIELD

The invention relates to controlling access to online data. More specifically, the invention relates to methods of detecting and deterring data access that does not comply with a policy under which access to the data is offered.

BACKGROUND

Over recent decades, business, social and other interactions have begun throwing off increasingly-detailed data, and these data have been collected, aggregated and saved with increasing diligence. Also, all forms of media are increasingly likely to originate in, or at least pass through, a digital phase, so they can also be stored, aggregated, searched, manipulated and retrieved. Despite the vanishingly small apparent value of many individual data records, aggregating, indexing and providing access to data can be a remarkably profitable line of business.

Those who provide data ("content") over the Internet have a strong interest—financially and otherwise—in ensuring that the content is used only in ways that the content provider permits. For example, a content provider may license its data for its customers' personal use only. However, a malicious party may acquire such a license but then proceed to download every available piece of content from the provider, not using it for his own use but instead republishing and/or reselling the content on the malicious party's own web site as his own. (Such downloading is sometimes called "screen scraping" or simply "scraping.") This harms the original content provider by creating a competing source for the same content—material that was effectively stolen from the original provider.

After-the-fact revocation of the malicious party's license is an inadequate solution, since once the content has been downloaded, it may be difficult or impossible to stop its further spread. In particular, some data to which access may be provided via license, may not be subject to copyright claims by the data provider—the provider's "value add" is in collecting and indexing the data. A malicious user who violates his license to harvest the entire database may not be liable for any legal claims beyond breach of contract, and in any case, the user may be beyond the reach of legal process available to the content provider, or may simply be judgment-proof.

Techniques to detect and frustrate or thwart access to data that does not comply with the license under which access is offered can be of value in this field.

SUMMARY

Embodiments of the invention monitor data requests associated with a user's access of licensed content to find patterns indicative of noncompliant use. When such patterns are detected, responsive measures can be taken to mitigate the subsequent access of content, thus protecting it.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Other people have invented methods for protecting content delivered via the Internet. However the method disclosed herein is better because:

It does not require any specialized software to be deployed to users of the content.

It does not require the use of encryption, digital rights management, or other cryptographic systems which add to the computational cost of the transaction, and can also inconvenience the end-user.

It does not change the experience of legitimate, compliant users of content. Other methods impose various obstacles that may affect compliant users as well as noncompliant users.

It works in real-time, making rapid decisions about whether the use of content should be stopped.

It can detect the noncompliant use of content before that content is actually re-purposed and re-sold to other users. It often catches the non-compliant use "in progress" rather than after the non-compliant use has been fully carried out.

Figure 1:
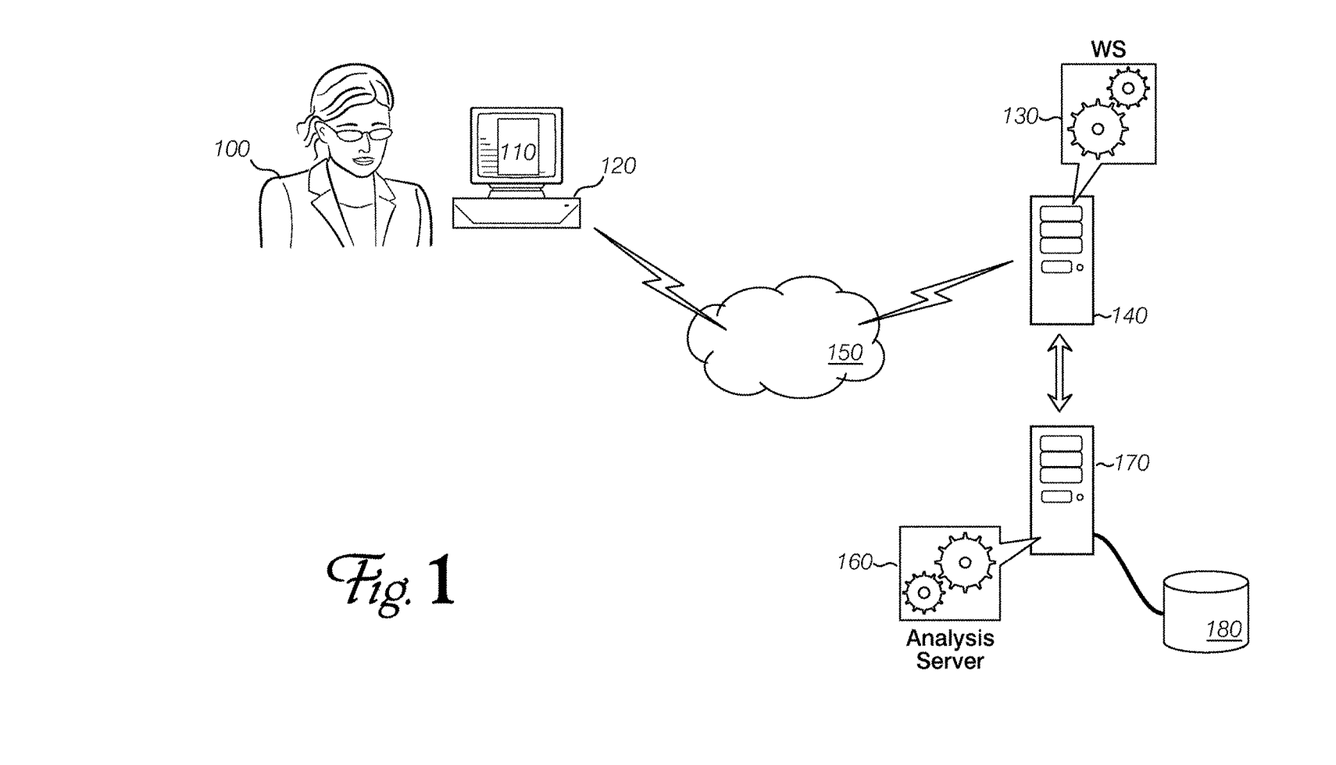
FIG. 1 shows a sample environment where an embodiment of the invention can be applied.

FIG. 1 shows a sample distributed computing environment where an embodiment of the invention operates. A user 100 operates a web browser 110 on her computer 120. This computer is used to retrieve content from a web server 130 running on a computer 140; communications are carried over a network 150 such as the Internet. Web server 130 collects information about the requests it receives from clients such as web browser 110, and shares that information with an analysis server process 160 running on another server 170. (In some embodiments, the web server 130 and analysis server 160 may execute on the same computer.) Analysis server 160 stores information from web server 130 in database 180, and can perform various statistical calculations on the data as required by the detection methods described below.

Figure 9:
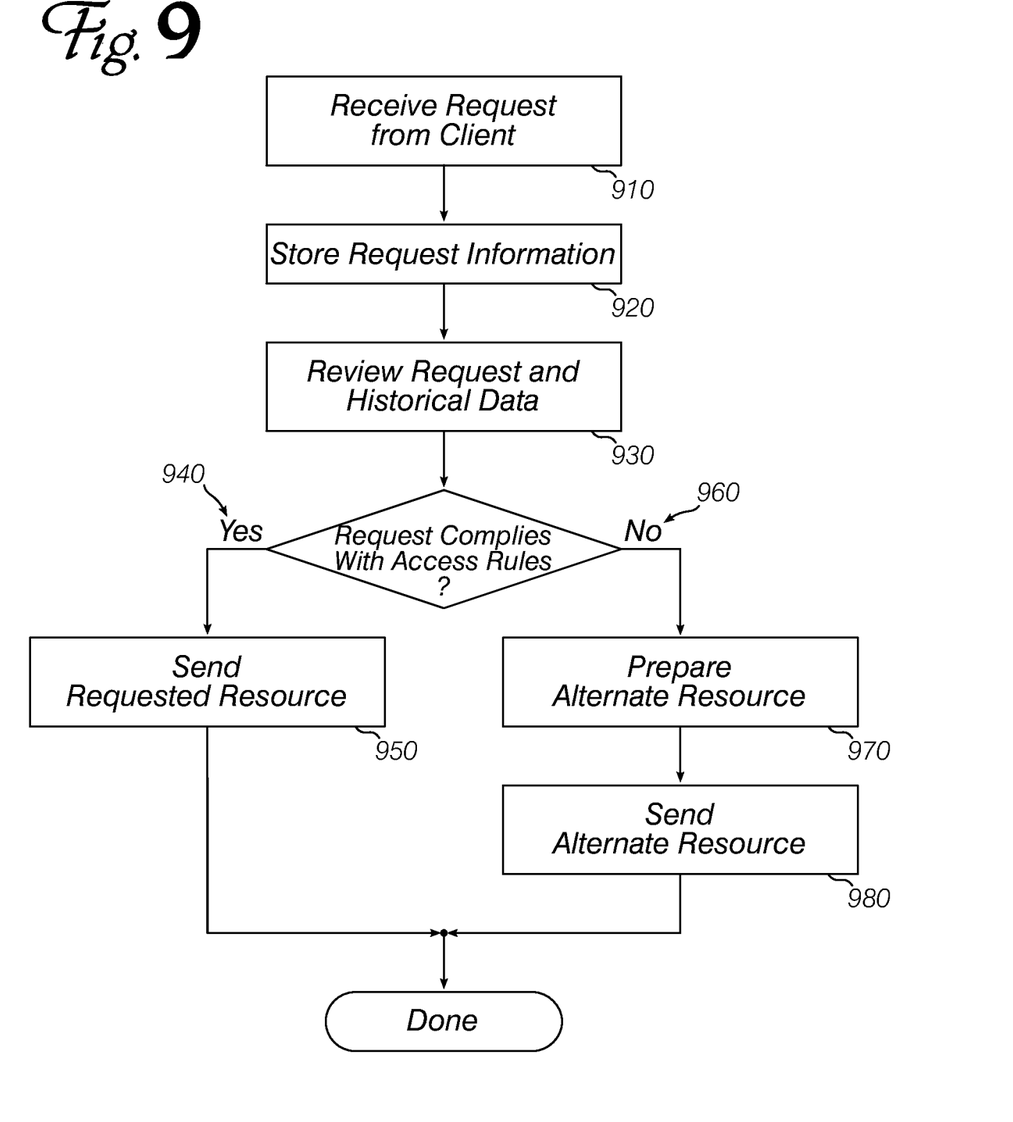
FIG. 9 is an overview flowchart of an embodiment.

FIG. 9 is a flow chart outlining the overall operation of an embodiment. The actions are not attributed to specific computers or software processes participating in the system because it is generally unimportant (from a functionality standpoint) where a step is performed. (Of course, it is appreciated that efficiency considerations may lead an implementer to group certain portions of a system together, or to ensure a low-latency or high-bandwidth communication path between critical sub-parts.) The flow chart follows a single client's request for a resource and the system's response. It should be clear that this procedure can be repeated for each additional request from the client, as well as for requests from other clients, and that it operates in an environment where historical request data from the clients has been saved and can be referred to in making decisions about present requests.

At 910, the system receives a request from a client to deliver a digital resource to the client. The request may be issued from a web browser as a result of a user clicking a hyperlink, or it may come from some other program, operating either under a user's control and direction, or configured to automatically issue requests. (Embodiments of the invention are often used to detect and deter this last sort of client.)

Information about the request (e.g., its source, timestamp, resource sought, user or license identification, etc.) is stored in a historical database for future reference (920), and content-protection logic reviews the request and historical data (930) to determine whether the client seems to be exploiting the resource by violating its terms of service. Several specific hallmarks of non-compliant access are discussed below.

If the client's request appears to be legitimate (i.e., acceptable under the terms of an access policy to which the client may be subject) (940) then the requested content is transmitted back to the client (950). For example, a web-based system might send a requested image, document or sound file. A streaming media system might begin playback of a selected movie. A database access portal might deliver a record describing a person, place or thing identified in the request.

On the other hand, if the client's request appears to violate the terms of the access policy (960), then an anti-scraping workflow process is instituted. In the embodiment being described here, the anti-scraping workflow is to prepare alternate content (970) and transmit it back to the client (980). A number of possible alternate contents are described below; the selection among these alternatives may depend on factors such as the system's certainty that the access policy is being violated, the number of recent violations by the requesting client, the nature of the content, and so on.

This completes the handling of a single request by an embodiment. Of course, the client may issue a new request, which may be treated similarly (though with the benefit of the additional historical information collected about the previous request).

Figure 2:
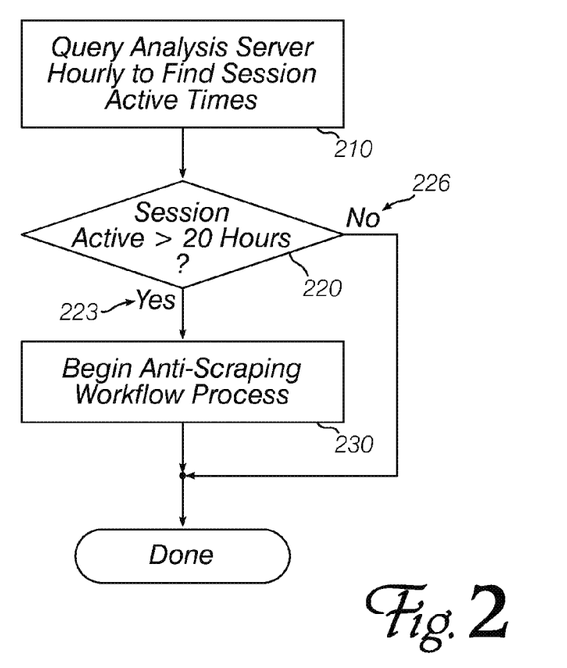
FIGS. 2-8 are flow charts illustrating noncompliant-download detection methods according to various embodiments of the invention.

Returning to the specific arrangement of functional parts shown in FIG. 1, upon receiving notice from the web server of a content access, the analysis server 160 may perform one or more tests to detect whether the content access pattern of the user suggest that noncompliant use is occurring. These checks include:

Looking at prior accesses of content by the user, and determining whether the clock-time duration of continuous use exceeds a threshold that is reasonable for a human user making acceptable use of the content. For example, if the same user account has accessed content continuously for longer than a configurable threshold time such as 20 hours, it is likely the content is being harvested automatically, in violation of the license agreement (FIG. 2).

Figure 3:
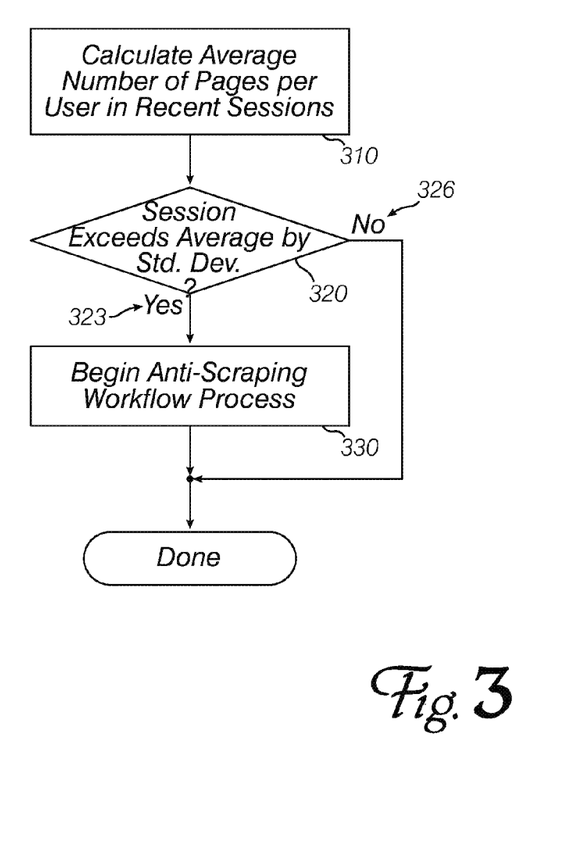

Looking at prior accesses of content by the user, is the number of pages accessed in the current session more than a configurable threshold, such as one standard deviation above the average number accessed by the same user in earlier sessions, or above the average number accessed by all users in an individual session? If so, content harvesting may be occurring (FIG. 3).

Figure 4:
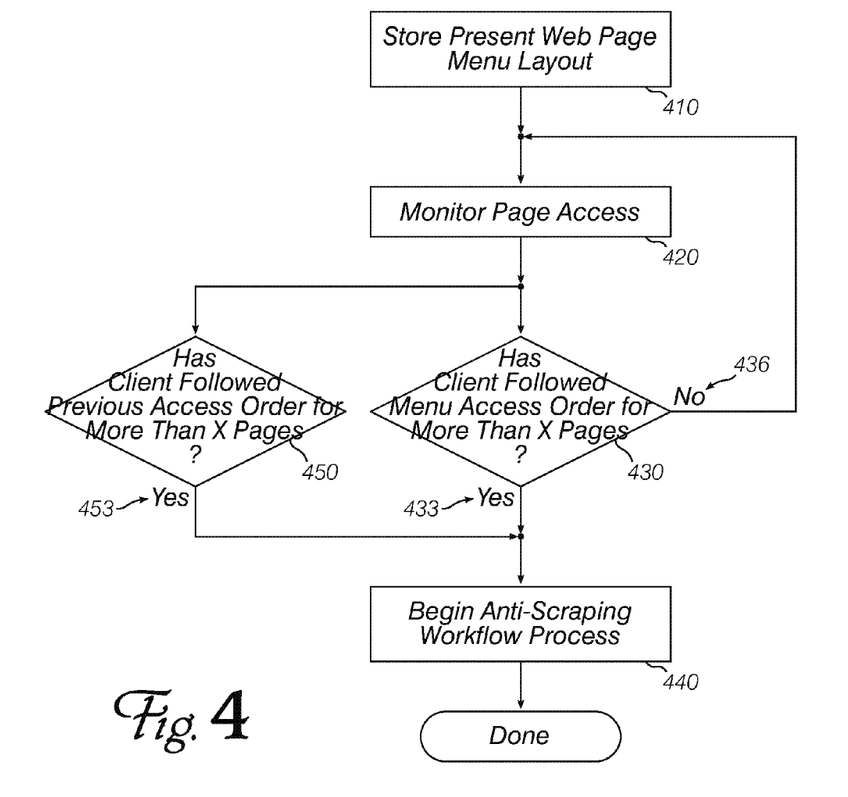

Looking at prior accesses of content by the user, observing whether the order of access of pages is in a deterministic order that is indicative of noncompliant use. For example, a legitimate user may access content in a fairly random order, following the path of human interest. However, a noncompliant automated harvesting system may access content in the same order that content is listed on menu pages or in another invariant order that can be detected by the analysis server (FIG. 4). An active menu-varying system may change the order of menu items within the source of an HTML page (without changing the visual order of the buttons or links on the screen). If the client's access order changes to the HTML order, it may be another indication that automatic harvesting is occurring.

Figure 5:
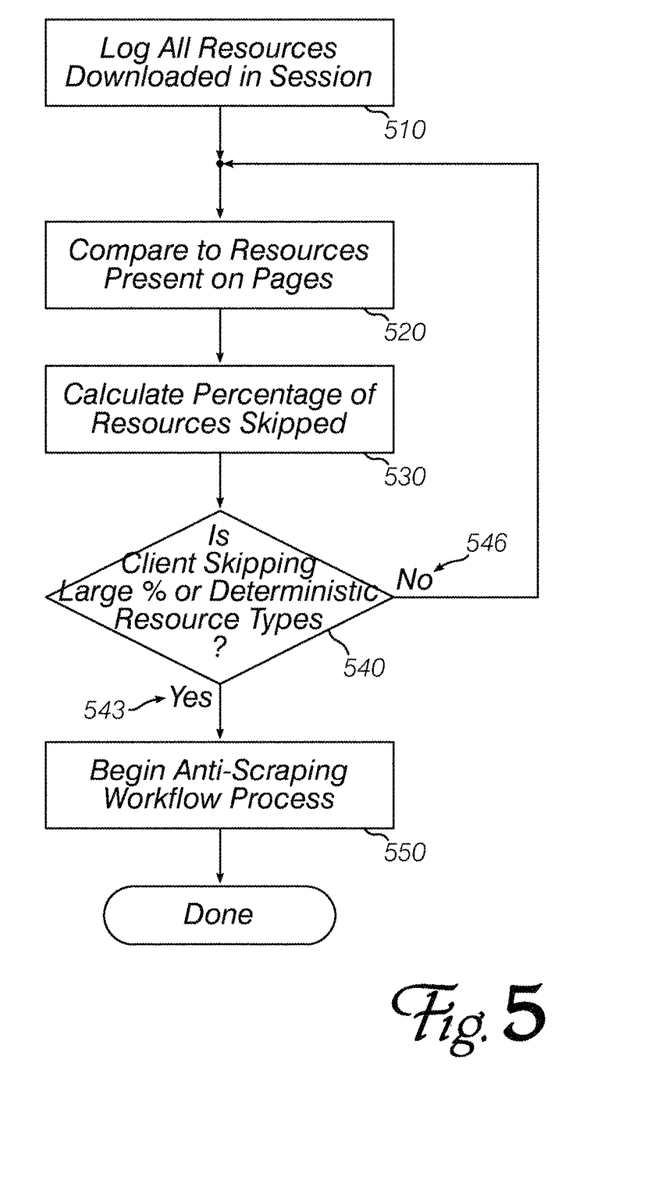

By embedding certain referenced elements in the content provided by the web server, the analysis server can examine browser requests to see whether these elements have been requested. The referenced elements are chosen so that compliant use would lead to them being requested, but noncompliant use would not. For example, if the referenced content is an image file, then a browser working on behalf of a legitimate user would request and show the image on the web page. However, an automated system harvesting content for noncompliant use may not bother to request some or all of the images on a page, since it may be designed to retrieve only the textual content (FIG. 5). This detection method can be implemented, for example, by using unique "control" images on each page. That is, images of buttons, backgrounds, banners and the like can be given unique names (although the underlying images may be shared from page to page). A compliant user's access program may retrieve these images every time, whereas a non-compliant program may skip them. The skipped resources would be evident by their absence from the access history: items that would be expected to have been retrieved would not be listed in the suspicious client's history.

Figure 6:
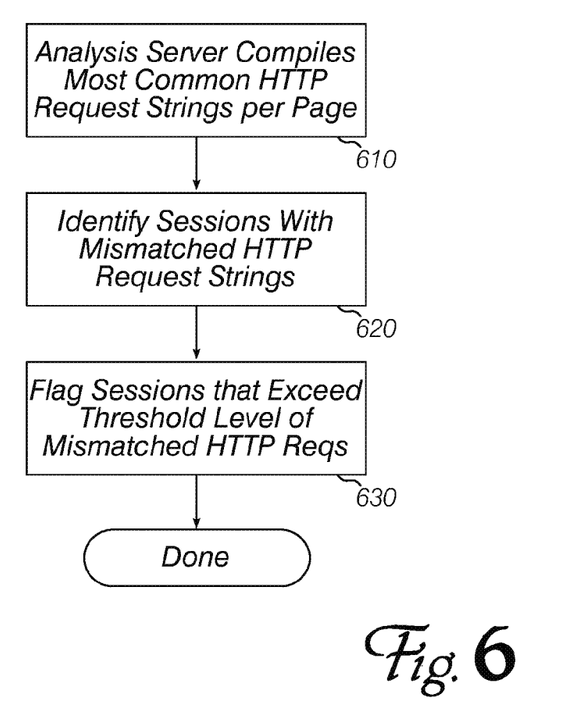

Looking at the current request from the browser (or automated data harvesting system) and observing whether the HTTP Headers, Cookies, and other aspects of the HTTP request have patterns that are different from what would be sent by a browser working for a legitimate human user. These checks include looking for an unexpected User-Agent string, the lack or unexpected resetting of cookies, or other similar traits (FIG. 6).

Figure 7:
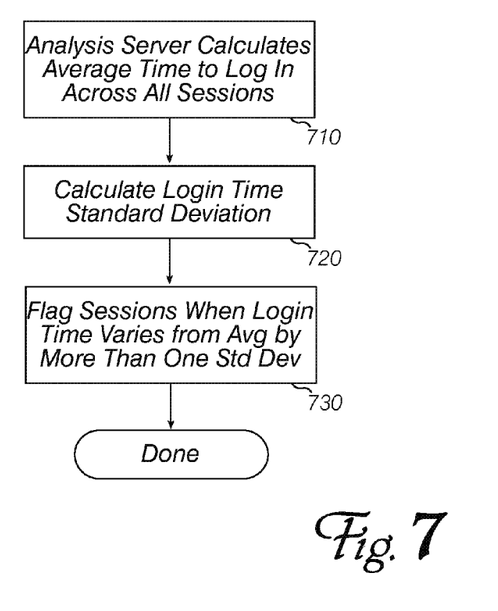

The analysis server may capture the time taken by a user to log in and compare it to a reasonable value for compliant use based on a system average time. For example, a compliant human user may log in at a certain pace, whereas a noncompliant automated system may log in far more rapidly (FIG. 7).

Figure 8:
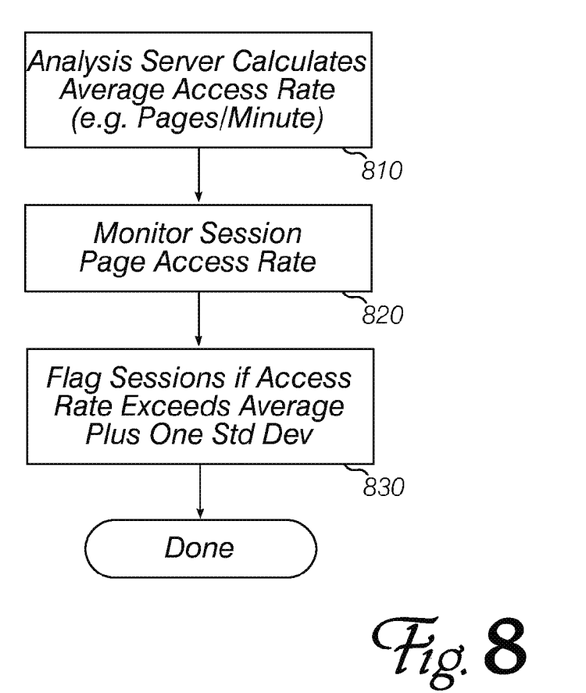

Looking at all prior content access by the user, calculating whether the amount of content accessed in a time period exceeds the expected maximum amount of content that a compliant user would be expected to access in the same time period, and flagging sessions that download more content than expected. For example, whereas a compliant user may access one piece of content every 30 seconds, a noncompliant automated content harvesting system may access 10 pieces of content per second (FIG. 8).

If one or more of the tests described above return a positive indication, the analysis server may instruct the web server to modify its response to subsequent requests from the user, on the assumption that the user is either manually or automatically harvesting content from the system in violation of his license. The modified response may be one or more of:

No data or an error indication to the user;

A message to "Contact Customer Service" or similar;

Legitimate content that does not match what is requested (for example, returning data about record 1234, although the browser requested record 4567; or streaming a public service announcement instead of a requested movie;

Syntactically valid but semantically meaningless content (for example, in a record describing a person, sending the expected "Name" and "Address" fields, but filled with random letters and numbers);

The requested content, but containing one or more errors or changes. The errors may be crafted to be obvious to a human observer (for example, a name may be changed to a string of Xs).

The analysis server may also be configured to send a notification via email or other channel to the content provider's security team when a noncompliant access pattern is detected.

In alternative embodiments of the invention, the web server, analysis server and database may all reside on the same computer, or may be on different computers.

The content protected by the invention may be a web page, or may be any other type of content provided by a web server such as images, Portable Document Format ("PDF") files, binary files, and so on. Embodiments of the invention can also be used to detect and discourage non-compliant access of streaming media such as movies and television programs or "Internet radio" music streams.

The tests for noncompliant use patterns may include some or all of the tests above, and may also include tests based on patterns identified by the content provider to be indicative of noncompliant use.

The tests may be run offline or in a batch fashion on stored data, rather than in real time on requests happening at the present moment.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that detection of noncompliant access to online content can also be accomplished by software and hardware that distribute the functions of embodiments of this invention differently than herein described. Such variations and implementations are understood to be captured according to the following claims.

I claim:

1. A method comprising:
   varying an order of items within a menu transmitted to a computer;
   receiving a request to transmit an identified resource to the computer, the request associated with a user who is subject to an access policy governing access to the identified resource;
   storing information about the request in a database of historical information;
   reviewing the request and the database of historical information to determine whether the request complies with the access policy; and
   if the request is unlikely to comply with the access policy because the database of historical information shows that the computer has varied its access order similarly to the order of the items within the menu transmitted to the computer, transmitting an alternate resource, different from the identified resource, to the computer.

2. The method of claim 1 wherein if the request is unlikely to comply with the access policy is if the database of historical information shows that the computer has failed to request resources that are expected to be requested.

3. The method of claim 1 wherein if the request is unlikely to comply with the access policy is if the database of historical information shows that the computer has accessed resources sequentially.

4. The method of claim 1 wherein if the request is unlikely to comply with the access policy is if the database of historical information shows that the computer has accessed resources continuously for longer than a threshold period of time.

5. The method of claim 1 wherein the identified resource is a database record.

6. The method of claim 5 wherein the database record is a sale listing for real property.

7. The method of claim 1 wherein the alternate resource is a video announcement explaining the access policy.

8. A system comprising:
   a web server;
   a library of digital content to be delivered by the web server;
   licensing logic to control access to the digital content in the library;
   menu-varying logic to alter an order of menu items in an HTML document without altering a corresponding order of menu items in an on-screen display; and
   content protection means for detecting a noncompliant attempt to access the digital content by comparing an access order of a client to the order of the menu items in the HTML document, and transmitting a different digital response than a digital response sought by the noncompliant attempt.

9. The system of claim 8 wherein the content protection means is to compare a first access pattern of an actual client to the webserver, to a second access pattern of a hypothetical client to the webserver, and
   transmit the different digital response if the first access pattern is different from the second access pattern.

10. The system of claim 8 wherein the content protection means is to detect the noncompliant attempt by identifying one of an unexpected User-Agent string, an unexpected HTTP header or an unexpected cookie setting in a request from a client.

11. The system of claim 8, further comprising:
    a database of prior requests issued to the web server, wherein
    the content protection means is to detect the noncompliant access attempt by an elevated rate of successive requests in the database of prior requests.

12. The system of claim 8 wherein the different digital response comprises the digital response sought by the noncompliant attempt with at least one error intentionally inserted.

13. A method comprising:
    receiving a request to transmit an identified resource to a computer, the request associated with a user who is subject to an access policy governing access to the identified resource;
    storing information about the request in a database of historical information;
    reviewing the request and the database of historical information to determine whether the request complies with the access policy; and
    if the request is unlikely to comply with the access policy because the database of historical information shows that the computer has completed a login process in less than a threshold period of time, transmitting an alternate resource, different from the identified resource, to the computer.

14. The method of claim 13 wherein if the request is unlikely to comply with the access policy is if the database of historical information shows that the computer has failed to request resources that are expected to be requested.

15. The method of claim 13 wherein if the request is unlikely to comply with the access policy is if the database of historical information shows that the computer has accessed resources sequentially.

16. The method of claim 13 wherein if the request is unlikely to comply with the access policy is if the database of historical information shows that the computer has accessed resources continuously for longer than a threshold period of time.

17. The method of claim 13 wherein the identified resource is a database record.

18. The method of claim 17 wherein the database record is a sale listing for real property.

19. The method of claim 13 wherein the alternate resource is a video announcement explaining the access policy.

* * * * *